United States Patent Office 3,649,705
Patented Mar. 14, 1972

3,649,705
PROCESS FOR PRODUCING LIQUID POLYMERS FROM DRIPOLENE
William A. Waranius, Galveston, Tex., assignor to Standard Oil Company, Chicago, Ill.
No Drawing. Continuation-in-part of application Ser. No. 800,703, Feb. 19, 1969. This application June 11, 1970, Ser. No. 45,573
Int. Cl. C07c 3/08, 15/10
U.S. Cl. 260—669 P   11 Claims

ABSTRACT OF THE DISCLOSURE

The process comprises treating a feedstock comprising dripolene with an unsaturated hydrocarbon at selected conditions to provide a treated feedstock and thermally polymerizing the treated feedstock to produce the liquid polymer. The unsaturated hydrocarbon may be selected from ethylene, propylene, and mixtures thereof. The resultant liquid polymer has improved stability and compatibility and a more desirable odor.

CROSS-REFERENCE TO RELATED APPLICATION

This is a continuation-in-part application of co-pending U.S. patent application Ser. No. 800,703, which was filed on Feb. 19, 1969, and now abandoned.

BACKGROUND OF THE INVENTION

Dripolene, a by-product of the thermal cracking of hydrocarbons to produce ethylene and propylene, contains unreactive aromatics and certain reactive components. These reactive components, which are olefins, diolefins, vinyl aromatics and their isomers, are normally so readily polymerized to resins that it is difficult to stop the polymerization to obtain a liquid polymer. Consequently, resins are commonly produced from feedstocks comprising dripolene, while liquid polymers are, in general, not produced. However, methods for modifying the polymerization ot obtain a liquid polymer have been devised. These prior art methods generally give low yields of unstable liquid polymers. Such liquid polymers are difficult to reproduce and have a tendency to oxidize under normal handling conditions. The liquid polymers also have obnoxious odors, contain traces of reactive material, are incompatible with such materials as linseed oil, and undergo further reaction. Such further reaction leads to resin whose softening points tend to change with time.

SUMMARY

There is provided a process for producing a liquid polymer from a feedstock comprising dripolene. Broadly, this process comprises: (1) treating said feedstock with an unsaturated hydrocarbon selected from the group consisting of ethylene, propylene and mixture thereof at a temperature within the range of about 300° F. to about 500° F. for a period of time within the range of about 1 hour to about 5 hours to provide a treated feedstock; and (2) thermally polymerizing said treated feedstock for a period of time within the range of about 1 hour to about 25 hours to produce said liquid polymer. The feedstock is comprised advantageously of dicyclopentadiene, styrene, and indene as reactive components and unreactive aromatics. The dicyclopentadiene is present in an amount within the range of about 10 weight percent to about 50 weight percent, the styrene is present in an amount within the range of about 10 weight percent to about 30 weight percent, and the indene is present in an amount within the range of about 0 weight percent to about 10 weight percent, each amount being based upon the weight of total feedstock. Preferred conditions include a temperature for treating said feedstock within the range of about 430° F. to about 480° F., a period of time for treating the feedstock of about 2½ to 3 hours, and a temperature for polymerizing the treated feedstock within the range of about 450° F. to about 480° F. for a period of time of about 16 hours.

DESCRIPTION AND PREFERRED EMBODIMENTS

Improved liquid polymers are obtained from a feedstock comprising dripolene by first treating said feedstock with an unsaturated hydrocarbon selected from the group consisting of ethylene, propylene, and mixtures thereof at a temperature within the range of about 300° F. to about 500° F. for a period of time within the range of about 1 hour to about 5 hours, followed by thermal polymerization at about 450° F. to about 480° F. for a period of time within the range of about 1 hour to about 5 hours. If the treating temperature, initially, is within the range of about 450° F. to about 480° F, the treatment with ethylene and the polymerization can be carried on simultaneously. The products are not friable resins, but are liquid polymers having desirable characteristics. Such liquid polymers are totally unexpected from the polymerization conditions. These liquid polymers can be reproduced, even from feedstocks comprising dripolene that have previously not been made polymerizable to liquid polymers by prior art methods because of their high content of diolefins. The liquid polymers of this invention are stable and unreactive.

The liquid polymers of this invention are useful as plasticizing agents in asphalt floor tiles. They provide lower costs and more flexibility for the asphalt floor tiles. When employed as plasticizing agents in asphalt floor tiles, the liquid polymers are present in an amount within the range of about 0.5 weight percent to about 25 weight percent, based upon the weight of the total composition.

The liquid polymers of this invention are useful as softener-extenders for rubber compositions. They may be employed with styrene-butadiene, butyl, neoprene, and ethylene-propylene rubbers. They are a suitable replacement for "bright stock" as a softener-extender for rubber compositions. They promote lower costs and, for this use, are present in an amount within the range of about 0.5 weight percent to about 40 weight percent, based upon the weight of the total rubber composition. In addition, they are useful as tackifiers for various rubbers.

The liquid polymers of this invention are useful also as plasticizers for oleoresinous paints and varnishes. In such application, they act as co-solvents and provide more flexibility, better adhesion, and lower costs and are present in an amount within the range of about 1 weight percent to about 25 weight percent, based upon the weight of the resin portion of the paint or varnish.

Moreover, the liquid polymers of the invention are useful for oleoresinous or rubber-based caulks and sealants. In such application, they provide lower costs.

The formation of the liquid polymers has two phases. The first is adsorption of the unsaturated hydrocarbon by the diolefins contained in the dripolene. The second is modification of the polymerization step by the products from the first step. It is theorized that the modification is caused by either: (1) adsorption of the unsaturated hydrocarbon, decreasing the amount of diolefin in the mixture, and thereby reducing the reactivity of the mixture, or (2) termination of the polymerization step by reaction of the unsaturated hydrocarbon reaction product, which acts as a chain terminator. These theories are presented here without intent to limit the invention in any manner. After the first phase is completed, the reaction product is thermally polymerized at a temperature within the range of about 450° F. to about 480° F. It is then that the unexpected liquid polymers are formed.

The new liquid polymers can then be stripped with natural gas at a temperature within the range of about 375° F. to about 450° F. for a period of time within the range of about ½ to about 2 hours to remove unreactives. The liquid polymers can be expected to have a viscosity of about 150 Saybolt Furol Seconds at about 210° F. and a flash point of about 400° F.

In accordance with the present invention, the process comprises: (1) treating the feedstock comprising dripolene with an unsaturated hydrocarbon while heating it under autogenous pressure to complete adsorption of the unsaturated hydrocarbon by the contained diolefins and then (2) thermally polymerizing the treated feedstock comprising dripolene. The preferred temperature is related to the type of diolefins present in the dripolene and usually ranges from about 430° F. to about 480° F.; the preferred time for treating the feedstock comprising dripolene with the unsaturated hydrocarbon is about 2½ to about 3 hours. The preferred time for the polymerization is about 16 hours. The amount of unsaturated hydrocarbon used is dependent upon the extent of modification desired; usually not more than 1 mole per mole of diolefin is required. Ethylene is the preferred unsaturated hydrocarbon; however, propylene can be substituted for ethylene in the process of this invention.

The following examples are presented to enable the reader to more fully understand this invention. It is to be understood that these examples are presented for the purpose of illustration only and are not intended to limit the scope of the invention presented herein.

EXAMPLE I

A feedstock comprising dripolene containing approximately 40 weight percent dicyclopentadiene, 20% styrene, and 5% indene (based upon the weight of total feedstock) as reactive components, the remainder being unreactive aromatics, is combined with about ⅔ mole of ethylene per mole of diolefin. This combination is held between 300° F. and 460° F. for about 3 hours. The mixture of feedstock comprising dripolene and ethylene is then thermally polymerized at 460° F. for a period of about 16 hours. The product is a liquid polymer. This polymer has overcome some of the earlier objections, having little odor, reproducible properties, and immunity to further reaction. The polymer, when stripped with natural gas at about 375° F. for about ½ to 2 hours to remove unreactives, has a viscosity of about 150 Saybolt Furol Seconds at 210° F. and a flash point of about 400° F. This flash point indicates complete removal of unreactive aromatics, yet surprisingly, the material is still a liquid polymer. Smaller amounts of ethylene would, of course, have less effect and at some concentration would yield a resin, but with a lower softening point than the resins formed without ethylene treatment.

EXAMPLE II

The same feedstock as used in Example I, but without pre-treating with ethylene, is thermally polymerized at 460° F. for a period of about 16 hours, with removal of unreactives. The product is a hard friable resin with a softening point of about 250° F. The disadvantages of this product are numerous; those being of greatest concern are obnoxious odor, poor solubility and chemical instability.

I claim:
1. A process for producing a liquid polymer from a feedstock comprising dripolene, which process comprises: (1) treating said feedstock with an unsaturated hydrocarbon selected from the group consisting of ethylene, propylene, and mixtures thereof at a temperature within the range of about 300° F. to about 500° F. for a period of time within the range of about 1 hour to about 5 hours to provide a treated feedstock; and (2) thermally polymerizing said treated feedstock for a period of time within the range of about 1 hour to about 25 hours to produce said liquid polymer.

2. The process of claim 1 wherein said feedstock comprises dicyclopentadiene, styrene, and indene as reactive components and unreactive aromatics.

3. The process of claim 1 wherein the temperature for said treating said feedstock is within the range of about 430° F. to about 480° F.

4. The process of claim 1 wherein said period of time for said treating said feedstock is about 2½ to 3 hours.

5. The process of claim 1 wherein the temperature for said thermally polymerizing said treated feedstock is within the range of about 450° F. to about 480° F.

6. The process of claim 1 wherein the time for said thermally polymerizing said treated feedstock is about 16 hours.

7. The process of claim 1 wherein unreactive aromatics are removed from said liquid polymer by stripping with natural gas.

8. The process of claim 2 wherein said dicyclopentadiene is present in an amount within the range of about 10 weight percent to about 50 weight percent, said styrene is present in an amount within the range of about 10 weight percent to about 30 weight percent, and said indene is present in an amount within the range of about 0 weight percent to about 10 weight percent, each amount being based upon the weight of total feedstock.

9. The process of claim 7 wherein said stripping is conducted at a temperature within the range of about 375° F. to about 450° F.

10. The process of claim 7 wherein said stripping is conducted for a period of time within the range of about one-half to about two hours.

11. A liquid polymer produced by the process of claim 1.

References Cited
UNITED STATES PATENTS 3,162,599  12/1964  McArthur et al. ____ 208—255 X CURTIS R. DAVIS, Primary Examiner